US008782613B2

(12) United States Patent  (10) Patent No.: US 8,782,613 B2
Hines  (45) Date of Patent: Jul. 15, 2014

(54) OPTIMIZING APPLICATIONS USING SOURCE CODE PATTERNS AND PERFORMANCE ANALYSIS

(75) Inventor: Larry M. Hines, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1282 days.

(21) Appl. No.: 12/190,478

(22) Filed: Aug. 12, 2008

(65) Prior Publication Data
US 2010/0042976 A1 Feb. 18, 2010

(51) Int. Cl.
G06F 9/44 (2006.01)
(52) U.S. Cl.
USPC .............................. 717/131; 717/127; 717/128
(58) Field of Classification Search
USPC .......................................... 717/127, 128, 131
See application file for complete search history.

(56) References Cited

U.S. PATENT DOCUMENTS

| 6,851,105 | B1* | 2/2005 | Coad et al. | 717/106 |
|---|---|---|---|---|
| 7,818,723 | B2* | 10/2010 | AliKacem et al. | 717/131 |
| 2003/0110474 | A1* | 6/2003 | Ur et al. | 717/131 |
| 2004/0163079 | A1* | 8/2004 | Noy et al. | 717/154 |
| 2005/0081106 | A1* | 4/2005 | Chang et al. | 714/38 |
| 2005/0108562 | A1* | 5/2005 | Khazan et al. | 713/200 |
| 2005/0125772 | A1* | 6/2005 | Kohno | 717/104 |
| 2005/0198526 | A1* | 9/2005 | Marr et al. | 713/200 |
| 2006/0053422 | A1* | 3/2006 | Alikacem et al. | 718/100 |
| 2006/0101440 | A1* | 5/2006 | Stay et al. | 717/151 |
| 2007/0288899 | A1* | 12/2007 | Fanning et al. | 717/124 |
| 2008/0120493 | A1* | 5/2008 | Yoo et al. | 712/225 |
| 2008/0148242 | A1* | 6/2008 | Cobb et al. | 717/130 |
| 2009/0044177 | A1* | 2/2009 | Bates et al. | 717/131 |
| 2009/0100415 | A1* | 4/2009 | Dor et al. | 717/131 |

OTHER PUBLICATIONS

IBM Application Performance Analyzer for z/OS: Customization Guide, Version 1, Release 1, 2006.*

* cited by examiner

Primary Examiner — Li B Zhen
Assistant Examiner — Viva Miller

(57) ABSTRACT

Applications are optimized using source code patterns and performance analysis. Patterns of inefficiently coded statements are stored, and source code that includes program statements are identified. The program statements are compared with the patterns to identify program statements that are inefficiently coded. An execution of a compiled version of the source code is monitored to identify program statements that cause performance issues The identified program statements that are inefficiently coded are compared with the identified program statements that cause performance issues to determine program statements that are inefficiently coded and cause performance issues.

15 Claims, 4 Drawing Sheets

OPTIMIZING APPLICATIONS USING SOURCE CODE PATTERNS AND PERFORMANCE ANALYSIS

TECHNICAL FIELD

This invention relates to software optimization, and more particularly to optimizing applications using source code patterns and performance analysis.

BACKGROUND

Re-factoring is a program development process by which the internal structure of an application is modified without changing their external behavior, functionality, or environment in order to improve understandability, reusability, ease of maintenance, agility or runtime performance. Re-factoring and other application modernization techniques often apply to older mainframe source code and other legacy applications in order to extend the legacy code's lifecycle and increase its flexibility. Re-factoring can also be used to optimize runtime performance. Runtime performance optimization is conventionally driven by a performance analysis tool. Typically, this is a largely manual process whose aim is to modify the highest consuming statement as identified by the performance analysis tool. The highest consuming statement, however, may not have a known modification that would improve performance while preserving the same functionality. Resources are wasted by focusing on all high consuming statements, rather than focusing on only statements with a known function-preserving, performance-improving modifications.

SUMMARY

This specification describes technologies relating to rendering and un-rendering using profile replacement.

In general, one aspect of the subject matter described in this specification can be embodied in a method that includes storing patterns of inefficiently coded statements; identifying source code comprising program statements; comparing the program statements with the patterns to identify program statements that are inefficiently coded; monitoring an execution of a compiled version of the source code to identify program statements that cause performance issues; and comparing the identified program statements that are inefficiently coded with the identified program statements that cause performance issues to determine program statements that are inefficiently coded and cause performance issues. Other embodiments of this aspect include corresponding systems, apparatus, and computer program products.

These and other embodiments can optionally include one or more of the following features. The patterns of inefficiently coded statements can include a particular pattern of inefficiently coded statements, the particular pattern corresponds to optimization instructions, the program statements that are inefficiently coded and cause performance issues can include a particular set of program statements that match the particular pattern. The method can further include modifying one or more portions of the source code associated with the particular set of program statements based on the optimization instructions; and validating the modified source code. The optimization instructions can include one or more substitute instructions, and modifying the one or more portions of the source code can include replacing the particular program statements with the one or more substitute statements. The patterns of inefficiency and the optimization instructions can be stored in a catalog. Validating can include compiling the modified source code; and testing the compiled version of the modified source code.

Each program statement of the identified program statements that are inefficiently coded and of the identified program statements that cause performance issues can have an associated file name and line number; and comparing the identified program statements that are inefficiently coded with the identified program statements that cause performance issues can include using the associated file names and line numbers to determine program statements that are inefficiently coded and cause performance issues.

Comparing the program statements with the patterns can include identifying a particular pattern in the patterns; and searching the program statements for the particular pattern. Monitoring an execution of a compiled version of the source code can include measuring utilization of one or more processors for at least a portion of the program statements.

The details of one or more embodiments of the invention are set forth in the accompanying drawings and the description below. Some advantages of one or more embodiments include flexibility in the tools used to analyze the code for inefficiencies. That is, many source code tools, such as scanners, parsers, analyzers, and other modification tools, exist for various programming languages. Inefficient source code statements can be directly identified, tracked, and used to provide feedback to computer programmers for quality assurance and other purposes. Other features, objects, and advantages of the invention will be apparent from the description and drawings, and from the claims.

DESCRIPTION OF DRAWINGS

Like reference symbols in the various drawings indicate like elements.

DETAILED DESCRIPTION

One mechanism to optimize runtime performance involves using a scanner to compare compiler listings against known patterns of compiler inefficiencies. The performance analysis results could be filtered in order to skip high consuming statements that correspond to compiler listings that do not have matches in the known patterns of inefficiencies. This approach formed the basis of U.S. Pub. No. US2006/0101440 entitled "System and Method for Optimizing Mainframe Applications." Disclosed in that publication, among other things, are systems and methods that scan compiler listings for statements matching a catalog of known inefficiencies and that accordingly filter the performance analysis results obtained from monitoring an execution of the application being optimized. Relying on compiler listings can be nevertheless problematic. First, the number of tools that can be used to scan, parse, and otherwise analyze compiled listings is relatively limited. Few production-ready scanners for compiler listings exist. Second, compiled listings are not usually standardized. The same source code compiled using two different compilers can result in two different compiled listings, making it difficult to create patterns identifying inefficient statements and scanners that apply to more than one particular compiler.

By using source code instead of compiled code, systems and methods can be realized that optimize source code by cross-referencing high consuming statements found by performance analysis results with inefficiently coded program statements found by source code analysis. The syntax of source code, in contrast to compiled code, is standardized by programming language, which allows inefficiency patterns and scanners to be used with source code virtually independent of the compiler used to compile the source code. Source code written in programming languages can be analyzed using the same source code analysis tool in certain instances where the syntax of the programming languages are sufficiently similar. Furthermore, in contrast to the tools available for compiled code, many source code tools, such as scanners, parsers, analyzers, and other modification tools, exist for various programming languages. Because source code is written directly by computer programmers, inefficient source code statements can be identified, tracked, and used to provide feedback to programmers for quality assurance and other purposes. These and other advantages may not apply to all embodiments.

Figure 1:
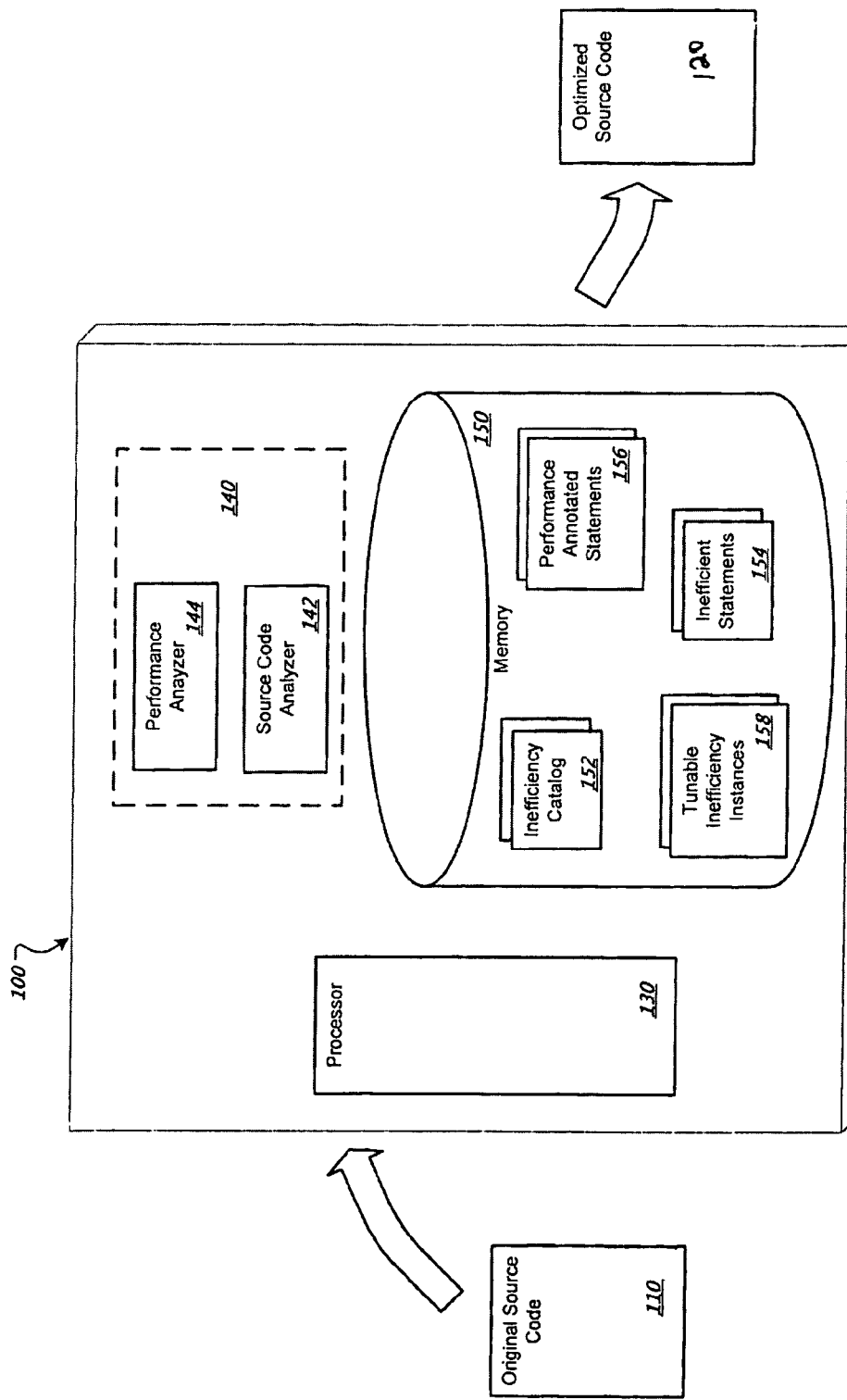
FIG. 1 is a block diagram of a system for optimizing the performance of a computer application.

FIG. 1 is a block diagram of a system for optimizing the performance of a computer application. As shown in FIG. 1, a system 100 for optimizing a computer application includes, among other things, a processor 130, optimization software 140, and memory 150. In general, upon receiving source code 110, the optimization software 140, specifically source code analyzer 142, compares the source code 110 with the inefficiency catalog 152 to determine inefficient statements 154. The system 100 also monitors the execution of source code 110 using performance analyzer 144, which determines the runtime performance of various statements in the source code. The optimization software 140 performs a cross-composition step to join the findings of the source code analyzer 142 and performance analyzer 144 to determine tunable inefficiency instances 158. These tunable inefficiency instances 158 can be used to modify the source code 110 by replacing or modifying inefficiently coded statements with optimized statements. Once validated, the optimized source code 120 can be made available for output.

Source code 110 can be any sequence of statements, instructions, or declarations written in a human-readable computer programming language. Source code 110 is generally translated into machine-readable code in an executable file by a compiler for later execution, or is translated and executed immediately by an interpreter. There are a myriad of computer programming languages that can be used to create source code 110, each with its own syntax and structure. Java® by Sun Microsystems, C, C++, C# by Microsoft, COBOL, and FORTRAN are just a few of the available programming languages. Source code 110 can range from simple to complex programs and can be created by human or by a machine.

Source code 110 can contain one or more sets of statements or instructions that perform inefficiently when executed. Inefficient programming statements can increase a computer application's execution time, increase CPU utilization, decrease system stability (due to deadlocks), and decrease end-user satisfaction (due to lower system availability and worse response times). Source code 110 is usually held in one or more text files. Source code 110 can constitute a full, self-contained computer application, or it can be a sub-part of the application, such as a function, a class, a subroutine, a code snippet, or other module contained within a larger computer application. Source code 110 can be stored in system 100, such as in memory 150, or it can be read or retrieved from another device. System 100 can use source code 110 to create optimized source code 120, which has one or more optimized programming statements, but functions the same as source code 110.

Processor 130 executes optimization software 140 in order to optimize source code 110. Processor 130 includes, by way of example, both general and special purpose microprocessors, and any one or more processors of any kind of digital computer. Generally, a processor 130 will receive instructions and data from a read only memory or a random access memory or both. The processor 130 can also be implemented as, special purpose logic circuitry, e.g., an FPGA (field programmable gate array) or an ASIC (application specific integrated Circuit). In general, the processor 130 executes optimization software 140, interacts with data stored in memory 150, receives source code 110, and makes available for output optimized source code 120.

Optimization software 140 is a computer program that, when executed, optimizes source code 110 using source code analyzer 142 and performance analyzer 144 to identify problematic or inefficient statements. Optimization software 140 may contain within it or be able to communicate with a source code analyzer 142 and performance analyzer 144 to identify inefficiently coded statements contained in source code 110 that both conform to a known pattern of inefficiency and are associated with poor performance. Once the inefficient statements are identified, optimization software 140 can, in some embodiments, automatically delete, modify, or replace one or more of the problematic statements with optimized statements that provide the same or similar function but that use fewer processing resources. Optimization software 140 can also validate or make available for validation the modified software.

Source code analyzer 142 accesses inefficiency catalog 152 to retrieve one or more statements and scans source code 110 to identify instances of these statements in the code. Source code analyzer 142 can be a single computer application integrated with the optimization software 140 or can be created using one or more products from different vendors. The inefficiency catalog 152 is a catalog, library, or other collection of patterns of statements or other portions of application code that have been determined to be inefficient or otherwise problematic. The patterns in the inefficiency catalog 152 can be determined in a variety of ways, such as common knowledge, institutional knowledge, and targeted testing. In addition to storing patterns of inefficient code, for each particular inefficiency pattern, the inefficiency catalog 152 can also specify how a set of instructions is detrimental to performance and provide possible solutions to correct, replace, delete, or otherwise optimize the set of statements matching the particular inefficiency pattern. Patterns can be related to, by way of example only, the following: definition and usage of numeric fields, processing of working storage tables, moving and comparing variable length strings or strings longer than a certain length, moves where the data source and target overlap, processing of working storage tables, complex loop end conditions, usage of link items larger than a specified size, frequently-executed dynamic sub-program calls, compiler options, language environment options, and usage of language library routines.

The source code analyzer 142 can read a pattern from the inefficiency catalog 152 and can search for the pattern in the source code 110 to identify one or more sets of instructions matching the pattern. The source code analyzer 142 can identify in the source code 110 the file names and line numbers of each statement in a set matching an inefficiency pattern in catalog 152, and can store the identified inefficient statements 154 in memory 150.

Performance analyzer 144 monitors the performance of executed source code 110. The performance analyzer 144 can be fully integrated with the optimization software 140. The performance analyzer 144 can also itself be, or communicate with, a third-party stand-alone application, such as Strobe by Compuware, Intune by BMC Software, gprof, an open source profiler by the Free Software Foundation, or the Application Performance Analyzer by IBM, just to name a few. In addition to monitoring and tracking the performance of the executed source code 110, the performance analyzer 144 can compile the source code and start its execution. As the code is executed, the performance analyzer 144 can track the relative CPU usage and other performance metrics associated with each statement in source code 110. These performance metrics can be tracked and associated with the file name and line number of each executed statement in the source code 110 and stored as performance annotated statements 156 in memory 150. The highest consuming statements can also be identified by the performance analyzer 144.

The optimization software 140 can perform a cross-composition step to join the results from the source code analyzer 142 and the results from the performance analyzer 144 to determine tunable inefficiency instances 158, which are the poor performing statements that conform to a known pattern of inefficiency. Some of the poor performing statements identified by the performance analyzer 144, however, may not be associated with known inefficiencies and some identified source code statements may not be associated with poor performance. There may be several different reasons for this. For example, it may be difficult to generalize a particular inefficiency using a pattern. As another example, the statement may be high-consuming out of necessity. Some statements that match a known inefficiency pattern may perform adequately during execution. This may be the result of the execution environment or other condition that may not be accounted for in the pattern. Additionally, poor performing statements that are associated with known inefficiencies (i.e., tunable inefficiency instances 158) can be optimized when a known solution to the inefficiency exists and can be identified in the cross-composition processing. The tunable inefficiency instances 158 can be used to automatically modify or otherwise optimize the source code 110.

The cross-composition can be performed by joining the two results using the file name and line number of the statements. Each tunable inefficiency instance 158 can be associated with the file name and line number of the instance 158, the performance of the instance 158, the inefficiency pattern to which the instance 158 conforms, and the solution to correct or optimize the instance 136.

In operation, the source code 110 is received, read, analyzed, executed and optimized by system 100. The source code analyzer 142 can read the inefficiency catalog 152 and search the source code 110 looking for matches. For each match found, the set of instructions conforming to the pattern along with their corresponding file names and line numbers can be identified in inefficient statements 154. The performance analyzer 144 can compile, execute, and/or monitor the source code 110 to identify the CPU usage and/or other performance metrics associated with the various lines of statements in the source code 110. Each source code statement, as identified by file name and line number, can be annotated with corresponding performance metrics. The performance analyzer 144 can also identify the statements that correspond to poor performance metrics. The results from the source code analyzer 142 and the performance analyzer 144 can be combined to identify tunable inefficiency instances 158, which can be used to optimize the source code 110. The optimization software 140 can modify the source code based on the tunable inefficiency instances 158 to create optimized source code 120. The optimized source code 120 can be validated using a preconfigured test to confirm that the functionality of the executed source code did not change based on the modifications. Once validated, the optimized source code 120 can be made available for output.

Figure 2:
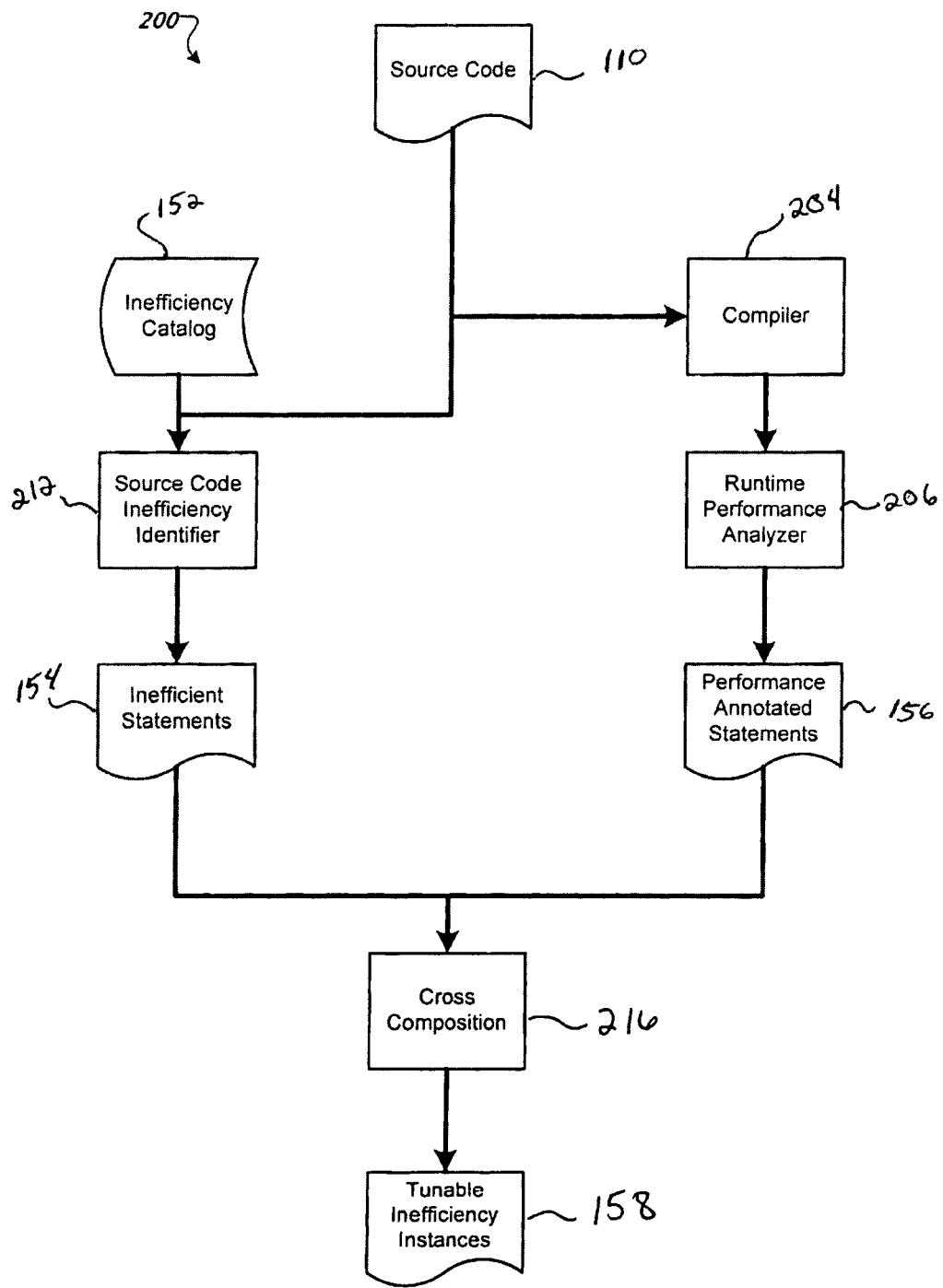
FIG. 2 is a flowchart of a process for identifying inefficient statements that have performance problems.

FIG. 2 is a flowchart of a process for identifying inefficient statements that have performance problems. The process described in FIG. 2 has essentially two branches, each receiving source code 110 as input. In the first branch on the right side of FIG. 2, the compiler 204 receives the source code 110 and compiles it. The compiler, which converts the human-readable source code 110 into machine-readable executable code, can be any commercially available compiler or can be tailored to a particular runtime performance analyzer 206. A runtime performance analyzer 206, such as the gprof and Strobe scanners described above, can be used to execute and monitor the compiled code and to determine performance metrics corresponding to the various statements of the source code. The performance annotated statements 156 can be created by the runtime performance analyzer 206 or created using results from the runtime performance analyzer 206. The performance annotated statements 156 can include the file names and line numbers of statements, and their corresponding performance metrics. The performance annotated statements 156 can also be filtered to include only high-consuming statements.

The source code inefficiency identifier 212 on the second branch on the left side of FIG. 2 receives as input the source code 110, and retrieves the inefficiency catalog 152. The inefficiency catalog 152 can store known solutions and their corresponding inefficiency patterns. The source code inefficiency identifier 212 reads patterns from the inefficiency catalog 152 and searches for matches in the source code 110. The sets of statements that match the known inefficiency patterns in the inefficiency catalog 152 can be used to create inefficient statements 154, which can include the file names and line numbers of each statement in the identified sets. In addition to the file name and line numbers associated with the sets of identified inefficient statements, the inefficient statements 154 can also include the known solution corresponding to each set of identified inefficient statements.

The results of the runtime performance analyzer 206 can be used to identify source code statements that consume excessive processing resources. The results of the source code inefficiency identifier 212 can be used to identify source code statements with potential inefficiencies. The results from the two branches can be combined in the cross-composition module 216. The cross-composition module 216 can use a variety of mechanisms to isolate those statements (i.e., tunable inefficiency instances 158) that are both known to be inefficient and associated with poor runtime performance. For instance, the cross-composition module 216 can perform a join between the inefficient statements 154 and performance annotated statements 156 using, for example, the filename and line numbers associated with each statement. As another example, the cross-composition module 216 can determine for each of the inefficient statements 154 the corresponding performance parameters, and then determine which of the performance annotated statements 156 are associated with poor performance. The tunable inefficiency instances 158 are made available for output.

Figure 3:
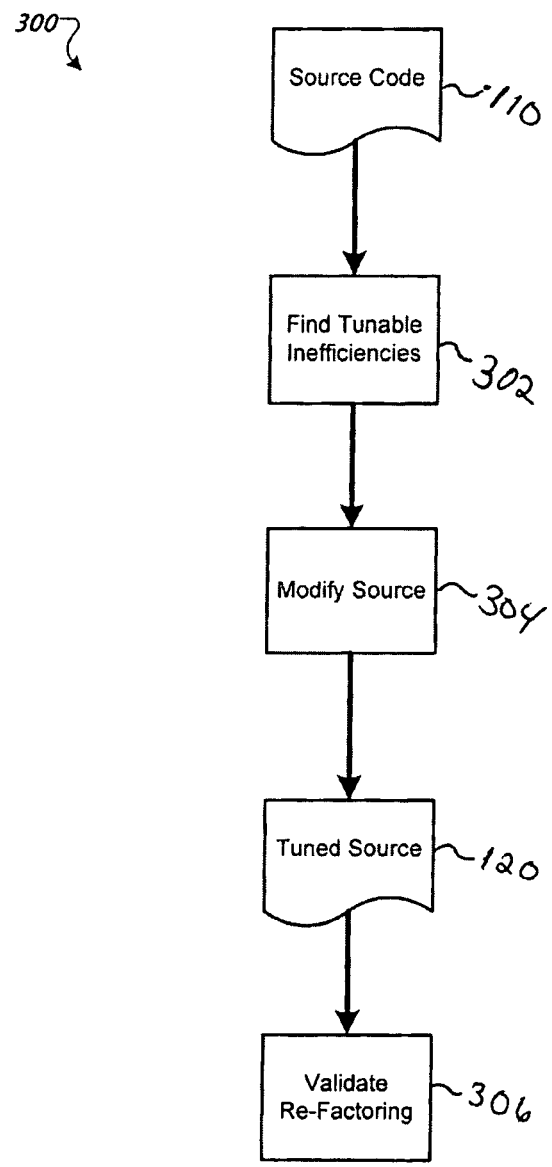
FIG. 3 is a flowchart of a process for optimizing the performance of a computer application.

FIG. 3 is a flowchart of a process for optimizing the performance of a computer application. The source code 110 that is to be optimized is received. At 302, the tunable inefficiencies are determined using systems, methods, and/or software that identify statements that are both associated with known source code inefficiencies and associated with poor performance. At 304, the tunable inefficiencies are used to optimize, re-factor, or otherwise modify the source code to create tuned source code 120. The re-factored or tuned source code 120 can then be validated at 306 to determine if there are any changes in the behavior of the re-factored source code.

Figure 4:
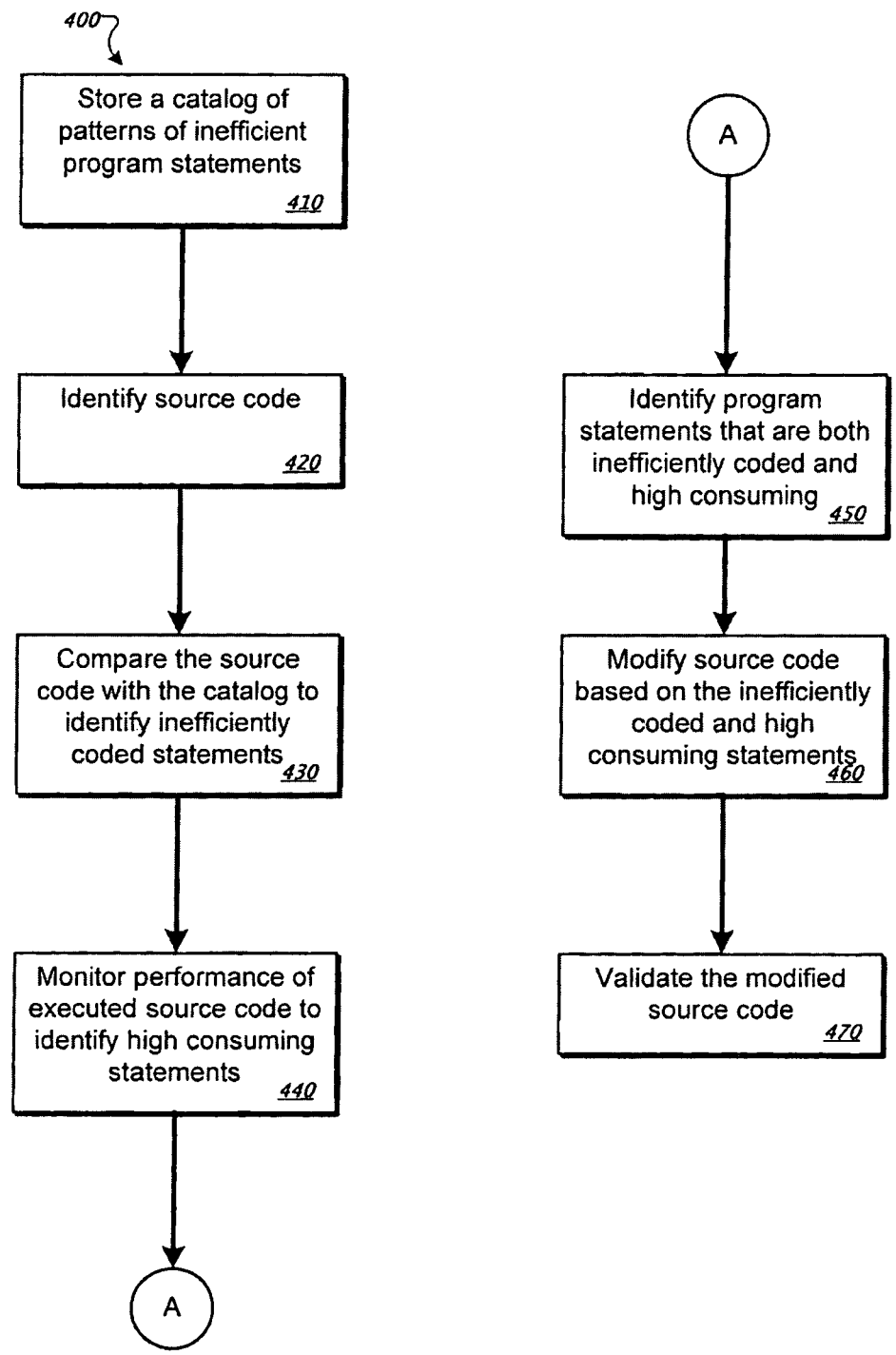
FIG. 4 is a flowchart of a process for optimizing the performance of a computer application based on correcting inefficient statements.

FIG. 4 is a flowchart of a process for optimizing the performance of a computer application based on correcting inefficient statements. At 410, a catalog of patterns of inefficient program statements are stored. The catalog may be stored in one or more files, database tables, or other data strictures. The catalog may also be incorporated into computer programs and/or programmable hardware logic, that uses the catalog to analyze the source code. Each inefficiency pattern can include, or be associated with, corresponding replacement or optimized code that can be used to correct statements matching the inefficiency patterns. At 420, the source code to be optimized is identified. The source code can be in any computer programming language supported by the catalog of patterns. Some catalog of patterns can support multiple computer programming languages.

At 430, the source code is compared with the catalog to identify inefficiently coded sets of statements. The comparison can be performed using a variety of tools. For example, a parser for the source code's computer programming language can be modified or used with other software to perform the comparison. Patterns in the catalog are used to find matching program statements. The identified inefficiently coded statements, the corresponding patterns to which they match, and the corresponding replacement or optimized code can be stored together or separately in one or more files with the inefficient statements being identified by file name and line number.

At 440, the performance of the executed source code is monitored to identify high consuming statements. Performance analysis tools, such as the scanners described above, can be used to determine performance metrics corresponding to the statements in the program. A report or file containing the high consuming statements can be created based on the results of the monitoring. The high consuming statements can be identified by file name and line number so that they can be cross-referenced with results from the catalog comparison.

At 450, the source code statements that are both inefficiently coded and high consuming are identified. There are several ways to identify these high consuming, inefficient source code statements. One way, for example, is to compare the results of the catalog comparison and the performance analysis, and to identify those statements that appear in both sets of results. The filenames and line numbers of each statement can be used as a key to combine the two results.

At 460, the source code can be modified based on the high consuming, inefficient source code statements. The corresponding replacement or optimized code associated with each of the high consuming, inefficient source code statements or sets of statements can be used to automatically modify the source code. The replacement statements can be implemented so as to maintain essentially the same functionality of the original source code. At 470, the modified source code can be validated to verify that the program's functionality remains unchanged after the modification. The process 400 can be performed by a batch job that optimizes the source code of multiple computer programs.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing-apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. The processes and logic flows described in this specification can be performed by one or more programmable processors executing one or more computer programs to perform functions by operating on input data and generating output.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g. internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the spirit and scope of the invention. For example, in searching for patterns in the source code, parameters such as environmental variables and compiler options can be considered. Accordingly, other embodiments are within the scope of the following claims.

What is claimed is:

1. A computer-implemented method comprising:
receiving a catalog of generic code statements that have each been determined to be an inefficiently coded statement, each generic code statement being a particular source code statement;
receiving actual source code for a computer program, the actual source code comprising a plurality of code statements;
without executing the computer program, matching the generic code statements against the actual source code to identify first code statements of the code statements of the actual source code that are each one of the generic code statements and that may potentially cause performance issues when the computer program is executed;
executing the computer program;
while the computer program is being executed, monitoring execution of a compiled version of the specific code statements to identify code statements of the actual source code that are actually causing performance issues, as second code statements, the second code statements identified without consideration of and not taking into account the first code statements that are identified, such that at least one second code statement is not a first code statement;
after the computer program has been executed, matching the first code statements that may potentially cause performance issues that are identical to the second code statements that actually caused performance issues, as third code statements, such that at least one first code statement and at least one second code statement are not third code statements; and
indicating to a user just the third code statements within the computer program as candidate code statements of the specific code statements of the computer program for optimization, such that the first code statements and the second code statements that are not third code statements are not indicated to the user,
wherein the catalog of generic code statements comprises:
a statement that increases execution time of a given computer program;
a statement that increases processor utilization when the given computer program is executed;
a statement that decreases system stability when the given computer program is executed;
a statement that decreases system availability when the given computer program is executed; and
a statement that decreases system response time when the given computer program is executed.

2. The method of claim 1, further comprising:
receiving optimization instructions for the third code statements as to how to rectify the performance issues caused by the third code statements;
modifying the actual source code for the computer program in accordance with the optimization instructions; and
validating the actual source code as has been modified.

3. The method of claim 2, wherein the optimization instructions comprise replacement code statements,
and wherein modifying the actual source code comprises replacing the third code statements with the replacement code statements.

4. The method of claim 2, wherein validating the actual source code as has been modified comprises:
compiling the actual source code as has been modified to generate a compiled version of the computer program; and testing a compiled version of the computer program.

5. The method of claim 1, wherein monitoring execution of the compiled version of the specific code statements comprises:
   measuring utilization of a processor when executing the specific code statements.

6. A computer program product, encoded on a non-transitory computer-readable storage medium, operable to cause data processing apparatus to perform operations comprising:
   receiving a catalog of generic code statements that have each been determined to be an inefficiently coded statement, each generic code statement being a particular source code statement;
   receiving actual source code for a computer program, the actual source code comprising a plurality of code statements;
   without executing the computer program, matching the generic code statements against the actual source code to identify first code statements of the code statements of the actual source code that are each one of the generic code statements and that may potentially cause performance issues when the computer program is executed;
   executing the computer program;
   while the computer program is being executed, monitoring execution of a compiled version of the specific code statements to identify code statements of the actual source code that are actually causing performance issues, as second code statements, the second code statements identified without consideration of and not taking into account the first code statements that are identified, such that at least one second code statement is not a first code statement;
   after the computer program has been executed, matching the first code statements that may potentially cause performance issues that are identical to the second code statements that actually caused performance issues, as third code statements, such that at least one first code statement and at least one second code statement are not third code statements; and
   indicating to a user just the third code statements within the computer program as candidate code statements of the specific code statements of the computer program for optimization, such that the first code statements and the second code statements that are not third code statements are not indicated to the user;
   wherein the catalog of generic code statements comprises:
      a statement that increases execution time of a given computer program;
      a statement that increases processor utilization when the given computer program is executed;
      a statement that decreases system stability when the given computer program is executed;
      a statement that decreases system availability when the given computer program is executed; and
      a statement that decreases system response time when the given computer program is executed.

7. The computer program product of claim 6, wherein the operations further comprise:
   receiving optimization instructions for the third code statements as to how to rectify the performance issues caused by the third code statements;
   modifying the actual source code for the computer program in accordance with the optimization instructions; and
   validating the actual source code as has been modified.

8. The computer program product of claim 7, wherein the optimization instructions comprise replacement code statements,
   and wherein modifying the actual source code comprises replacing the third code statements with the replacement code statements.

9. The computer program product of claim 7, wherein validating the actual source code as has been modified comprises:
   compiling the actual source code as has been modified to generate a compiled version of the computer program; and
   testing a compiled version of the computer program.

10. The computer program product of claim 6, wherein monitoring execution of the compiled version of the specific code statements comprises:
    measuring utilization of a processor when executing the specific code statements.

11. A system comprising:
    memory operable to store a catalog of generic code statements that have each been determined to be an inefficiently coded statement, each generic code statement being a particular source code statement;
    one or more data processing apparatuses operable to interact with the memory and to perform operations comprising:
       receiving actual source code for a computer program, the actual source code comprising a plurality of code statements;
       without executing the computer program, matching the generic code statements against the actual source code to identify first code statements of the code statements of the actual source code that are each one of the generic code statements and that may potentially cause performance issues when the computer program is executed;
       executing the computer program;
       while the computer program is being executed, monitoring execution of a compiled version of the specific code statements to identify code statements of the actual source code that are actually causing performance issues, as second code statements, the second code statements identified without consideration of and not taking into account the first code statements that are identified, such that at least one second code statement is not a first code statement;
       after the computer program has been executed, matching the first code statements that may potentially cause performance issues that are identical to the second code statements that actually caused performance issues, as third code statements, such that at least one first code statement and at least one second code statement are not third code statements; and
       indicating to a user just the third code statements within the computer program as candidate code statements of the specific code statements of the computer program for optimization, such that the first code statements and the second code statements that are not third code statements are not indicated to the user,
    wherein the catalog of generic code statements comprises:
       a statement that increases execution time of a given computer program;
       a statement that increases processor utilization when the given computer program is executed;
       a statement that decreases system stability when the given computer program is executed;

a statement that decreases system availability when the given computer program is executed; and a statement that decreases system response time when the given computer program is executed.

12. The system of claim 11, wherein the operations further comprise:

receiving optimization instructions for the third code statements as to how to rectify the performance issues caused by the third code statements;

modifying the actual source code for the computer program in accordance with the optimization instructions; and validating the actual source code as has been modified.

13. The system of claim 12, wherein the optimization instructions comprise replacement code statements, and wherein modifying the actual source code comprises replacing the third code statements with the replacement code statements.

14. The system of claim 12, wherein validating the actual source code as has been modified comprises:

compiling the actual source code as has been modified to generate a compiled version of the computer program; and testing a compiled version of the computer program.

15. The system of claim 11, wherein monitoring execution of the compiled version of the specific code statements comprises:

measuring utilization of a processor when executing the specific code statements.

\* \* \* \* \*

UNITED STATES PATENT AND TRADEMARK OFFICE
CERTIFICATE OF CORRECTION

PATENT NO.         : 8,782,613 B2
APPLICATION NO.    : 12/190478
DATED              : July 15, 2014
INVENTOR(S)        : Hines Page 1 of 1

It is certified that error appears in the above-identified patent and that said Letters Patent is hereby corrected as shown below:

On the title page item [57], line 8, delete "issues" and insert -- issues. --, therefor.

In the claims

Column 11, line 47, Claim 6, delete "user;" and insert -- user, --, therefor.

Signed and Sealed this
Sixth Day of October, 2015

Michelle K. Lee
*Director of the United States Patent and Trademark Office*